US009124198B2

(12) United States Patent
Krenz et al.

(10) Patent No.: US 9,124,198 B2
(45) Date of Patent: Sep. 1, 2015

(54) MULTIPLEXED MOTOR CONTROLLER

(71) Applicant: HAMILTON SUNDSTRAND CORPORATION, Windsor Locks, CT (US)

(72) Inventors: Michael J. Krenz, Roscoe, IL (US); Scott M. Thomson, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 3 days.

(21) Appl. No.: 13/858,472

(22) Filed: Apr. 8, 2013

(65) Prior Publication Data
US 2014/0300297 A1    Oct. 9, 2014

(51) Int. Cl.
H02P 5/00      (2006.01)
H02P 5/46      (2006.01)
H02P 7/08      (2006.01)
H02P 5/74      (2006.01)
B64C 13/50     (2006.01)

(52) U.S. Cl.
CPC .. H02P 5/00 (2013.01); H02P 5/74 (2013.01); B64C 13/50 (2013.01)

(58) Field of Classification Search
CPC .................................. B64C 13/50; H02P 5/00
USPC ........................................................... 318/67
See application file for complete search history.

(56) References Cited

U.S. PATENT DOCUMENTS

| 4,897,587 | A |   | 1/1990  | DiGiulio et al. |
|-----------|---|---|---------|-----------------|
| 5,274,554 | A | * | 12/1993 | Takats et al. ................. 701/29.2 |
| 5,952,806 | A | * | 9/1999  | Muramatsu ............... 318/568.12 |
| 7,268,522 | B1|   | 9/2007  | Baker |
| 7,332,884 | B2|   | 2/2008  | Rozman et al. |
| 7,362,070 | B2|   | 4/2008  | Games et al. |
| 7,365,511 | B2|   | 4/2008  | Nguyen |
| 7,529,268 | B1|   | 5/2009  | Solanki |
| 7,567,047 | B2|   | 7/2009  | Rozman |
| 7,782,007 | B2|   | 8/2010  | Halsey |
| 7,804,263 | B2|   | 9/2010  | Himmelmann et al. |
| 7,888,901 | B2| * | 2/2011  | Larson et al. ................. 318/628 |
| 7,922,117 | B2|   | 4/2011  | Wavering et al. |
| 8,078,340 | B2| * | 12/2011 | Johnson et al. .................... 701/3 |
| 8,080,966 | B2| * | 12/2011 | Potter et al. .................... 318/625 |
| 8,295,995 | B2|   | 10/2012 | Poisson |
| 2002/0117980 | A1 |   | 8/2002  | Echols et al. |
| 2004/0124023 | A1 |   | 7/2004  | Plishner |
| 2007/0033435 | A1 |   | 2/2007  | Stange et al. |
| 2010/0028164 | A1 |   | 2/2010  | Matsui |

OTHER PUBLICATIONS

Extended European Search Report for EP Application No. 14162890.9-1802, dated Aug. 18, 2014, pp. 1-7.
European Office Action for EP Application No. 14 162 890.9-1802, dated May 6, 2015, pp. 1-5.

* cited by examiner

Primary Examiner — Erick Glass
(74) Attorney, Agent, or Firm — Cantor Colburn LLP

(57) ABSTRACT

A system, multiplexed controller, and a method of controlling a plurality of motors is described. The system includes a plurality of motors, at least two of the motors requiring a variable-frequency source or being a multi-speed motor. The multiplexed controller of the system is configured to control operation of the plurality of motors, the controller directly communicating with each of the plurality of motors.

15 Claims, 4 Drawing Sheets

MULTIPLEXED MOTOR CONTROLLER

BACKGROUND OF THE INVENTION

Exemplary embodiments pertain to the art of controlling variable frequency source or multi-speed motors.

Variable-frequency source or multi-speed motors require motor controllers for their operation. These controllers are often costly, large, and heavy. Thus, including a controller with each variable frequency source or multi-speed motor can be not only costly but also especially problematic in environments, such as in aircraft applications, for example, in which weight and volume considerations may be critical.

BRIEF DESCRIPTION OF THE INVENTION

According to one embodiment, a system includes a plurality of motors, at least two of the motors requiring a variable-frequency source or being a multi-speed motor; and a multiplexed controller configured to control operation of the plurality of motors, the controller directly communicating with each of the plurality of motors.

According to another embodiment, a method of controlling a plurality of motors includes receiving, at a processor of a multiplexed controller, one or more signals to initiate operation of respective one or more motors directly from corresponding one or more initiators; prioritizing, based on priority information stored in a memory device, the signals when two or more signals are received; and processing the signals, with the processor, based on a result of the prioritizing to generate waveforms to drive the respective motors.

According to yet another embodiment, a multiplexed controller includes an input interface to receive one or more signals directly from corresponding one or more initiators; and a processor configured to process the one or more signals to output waveforms to respective one or more motors whose operation is controlled by the waveforms.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

As noted above, including a controller with each variable frequency source or multi-speed motor can be impractical, especially for certain low-utilization motors, based on a balancing of the weight and volume penalty of the controllers to the utilization needs. Embodiments described herein include a multiplexed motor controller for controlling multiple motors with a weight and volume penalty comparable to that of a single controller.

Figure 1:
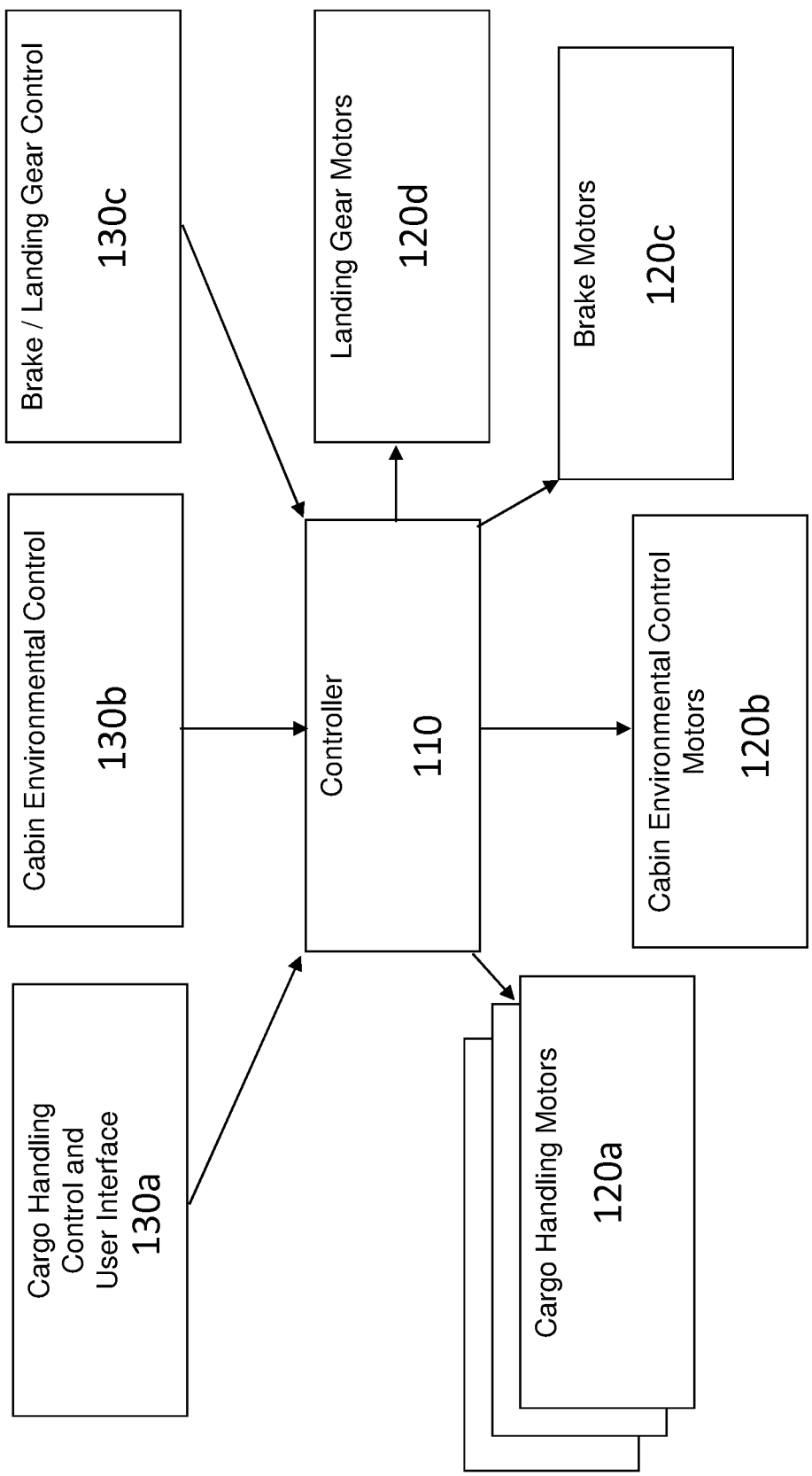
FIG. 1 is a block diagram of an exemplary system including a multiplexed motor controller according to an embodiment of the invention.

FIG. 1 is a block diagram of an exemplary system including a multiplexed motor controller 110 according to an embodiment of the invention. As detailed below, the multiplexed controller 110 is in direct communication with a plurality of motors 120. The multiplexed controller 110 is also in direct communication with a plurality of systems that may be regarded as motor initiators 130 because they signal the need to initiate action from a motor 120. For example, the cargo handing control and user interface (initiator 130a) may provide a signal or user command to the multiplexed controller 110 to initiate operation of one or more of the cargo handling motors 120a. The format of the signal from each initiator 130 may be different. Thus, the multiplexed controller 110 must recognize each of the different formats. In addition, the waveform to each motor 120 may also be different such that the multiplexed controller 110 must generate each of the different waveforms. Based on the particular motor 120 being controlled, closed-loop control may be used by the multiplexed controller 110 to control and adjust the speed and torque of a motor 120 as needed.

Because a signal may be received from more than one initiator 130 at a time, the multiplexed controller 110 may process the coincident signals in parallel. In alternate embodiments, the multiplexed controller 110 may perform concurrent processing. In this embodiment, signals from different initiators 130 may be prioritized based on the associated motor 120 functionality. That is, when signals from two different initiators 130 are received at the same time, an associated priority, implemented as a look-up table, for example, may be used to determine the order in which the signals are processed by the multiplexed controller 110. In yet another embodiment, based on the types of motors 120 that are controlled by the controller 110, neither parallel nor concurrent processing may be necessary. For example, the exemplary motors 120 shown in FIG. 1 may not be initiated simultaneously based on a normal operation of the aircraft, thereby precluding a need for the multiplexed controller 110 to handle simultaneous initiator 130 signals.

Figure 2:
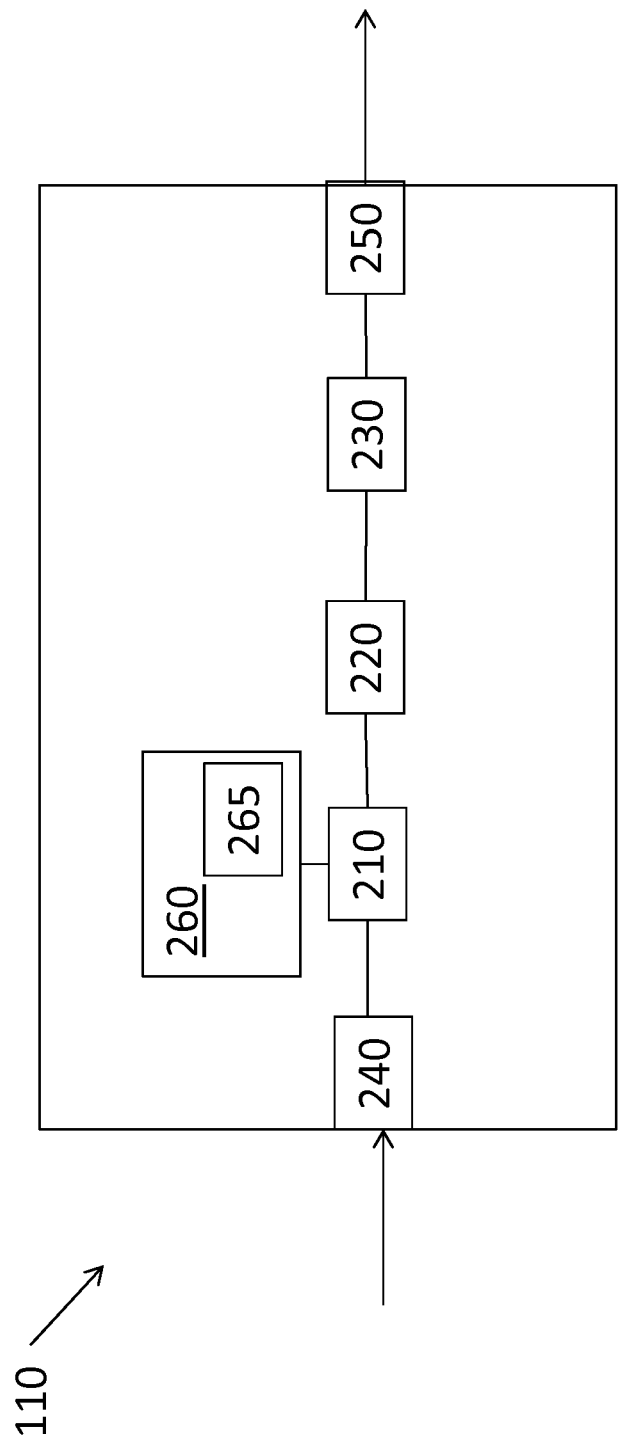
FIG. 2 is a block diagram of a multiplexed controller according to an embodiment of the invention.

FIG. 2 is a block diagram of a multiplexed controller 110 according to an embodiment of the invention. In the embodiment shown in FIG. 2, the multiplexed controller 110 implements concurrent processing. The controller 110 includes one or more processors 210 (e.g., digital signal processor, DSP), one or more power switching devices 220 (e.g., insulated gate bipolar transistors, IGBT), and filters 230 to address electromagnetic noise generated on the waveforms to the motors 120. In addition, the multiplexed controller 110 includes one or more input interfaces 240 to receive input from the initiators 130 and one or more output interfaces 250 to send waveforms to the motors 120. The multiplexed controller 110 may also include one or more memory devices 260 accessible by the one or more processors 210. The memory device 260 may store a look-up table prioritizing the motors 120 controlled by the multiplexed controller 110 so that concurrently received signals from initiators 130 may be processed based on the priority of the associated motors 120. In addition, the memory device 260 may store instructions for the processor 210. For example, the instructions may dictate how the processor 210 should interleave the processing of a newly received signal from an initiator 130 with closed loop control of a motor 120 based on a previously received signal from another initiator 130. In one or more embodiments of the invention, the memory device 260 may store a configuration file 265 to identify the type for each motor 120 and the priority among the motors 120. The configuration file 265 may be updated to add motors or to change priorities as needed.

Figure 3:
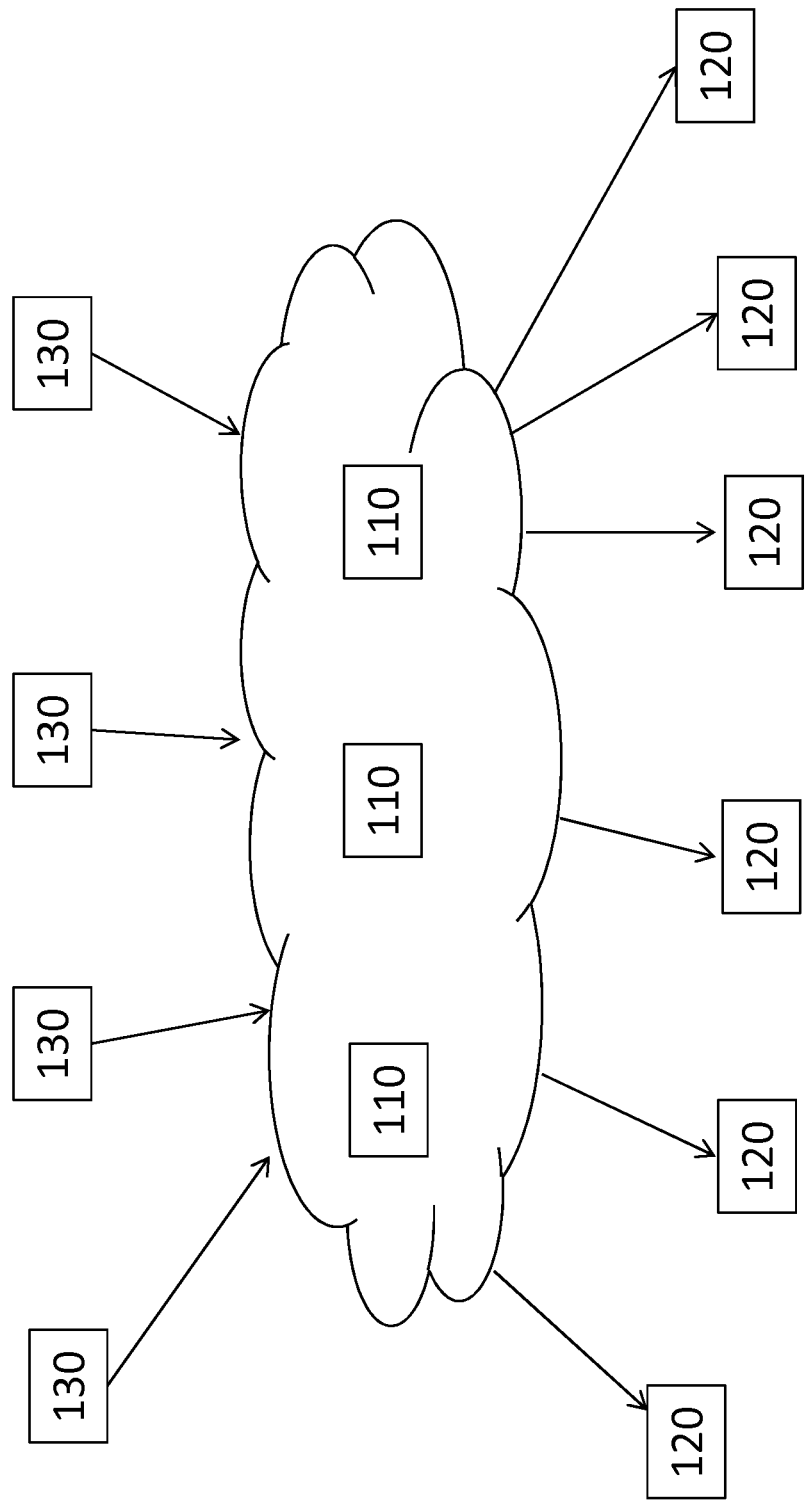
FIG. 3 is a block diagram of an exemplary system including a matrix of multiplexed motor controllers according to an embodiment of the invention.

FIG. 3 is a block diagram of an exemplary system including a matrix of multiplexed motor controllers 110 according to an embodiment of the invention. According to the present many-to-many embodiment, a group of multiplexed controllers 110, fewer in number than the number of motors 120 in the system, controls the motors 120 together. That is, the multiple multiplexed motor controllers 110 perform parallel processing of initiator 130 signals received at the same time according to one embodiment. In alternate embodiments, the multiple multiplexed motor controllers 110 may operate in tandem in an order dictated by the priority of the motors 120 signaled for operation. Each of the multiplexed motor controllers 110 may include the elements shown in FIG. 2. The configuration file 265 may be shared among the multiple multiplexed motor controllers 110 or may be stored within a memory device 260 of each multiplexed motor controller 110 but updated so that each multiplexed motor controller 110 stores the same information in the configuration file 265. In alternate embodiments, each configuration file 265 of each of the multiple multiplexed motor controllers 110 may be different. In this embodiment, each multiplexed motor controller 110 may prioritize a different motor 120 based on its individual configuration file 265.

Figure 4:
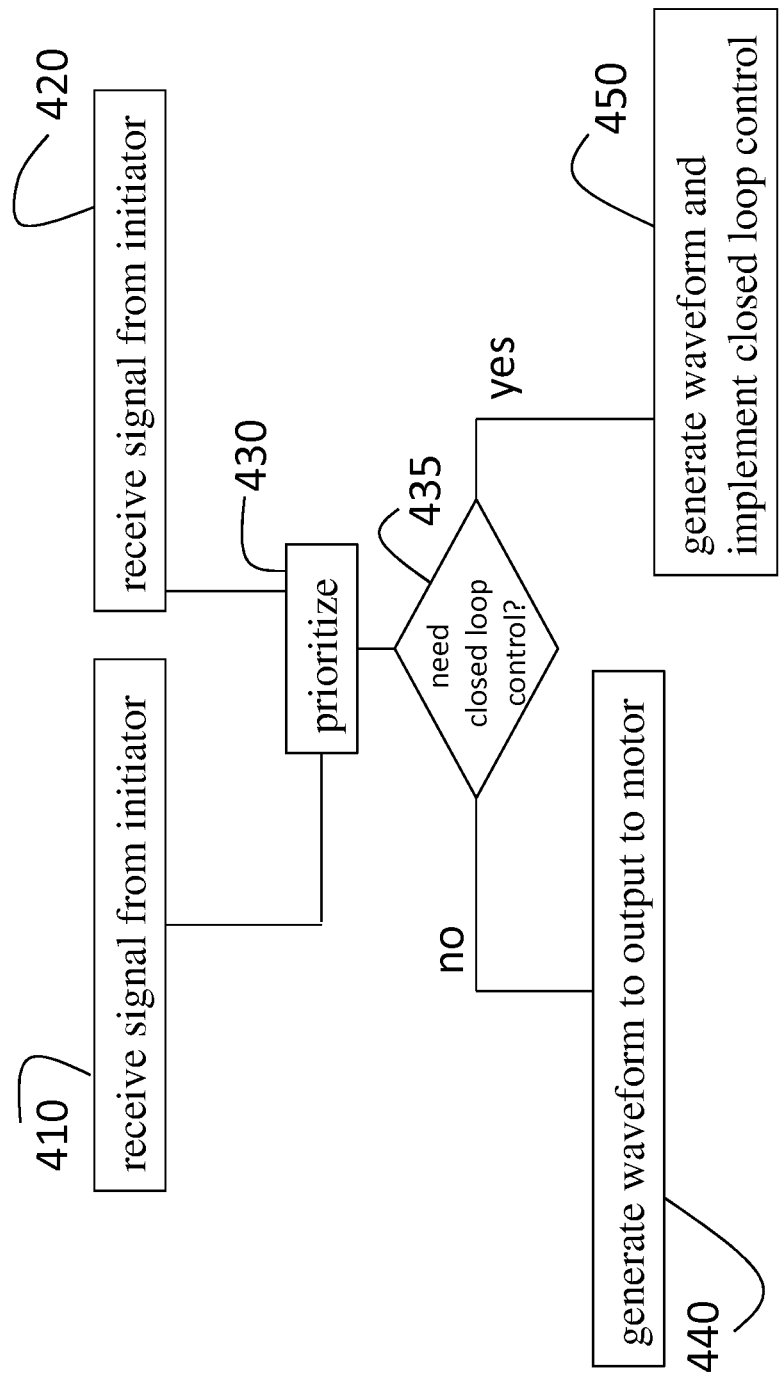
FIG. 4 is a flow diagram of a process implemented by a multiplexed controller according to an embodiment of the invention.

FIG. 4 is a flow diagram of a process implemented by a multiplexed controller 110 according to an embodiment of the invention. Receiving a signal from an initiator 130 at blocks 410 and 420 may be coincidental. When two or more signals are received coincidentally, prioritizing the received signals at block 430 may include the processor 210 consulting a look up table stored by the memory device 260 to determine which signal relates to initiating operation of a higher priority motor 120. At block 435, the multiplexed controller 110 determines whether there is a need for closed loop control of the motor 120 associated with the initiator signal being processed. Based on a result of the prioritizing or based on a single received signal (block 430) and based on a decision regarding closed loop control (block 435), the process includes generating a waveform to output to the associated motor 120 at block 440 or generating a waveform and implementing closed loop control of the associated motor 120 to adjust speed and torque as needed at block 450. When multiple signals are being processed, the priority determined at block 330 may be used to determine how to interleave the closed loop control with generating a waveform for another motor 120.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A system comprising:
    a plurality of motors, at least two of the motors requiring a variable-frequency source or being a multi-speed motor; and
    a multiplexed controller configured to control operation of the plurality of motors, the controller directly communicating with each of the plurality of motors, wherein the multiplexed controller performs concurrent processing to control of the operation of two or more of the plurality of motors such that, when two or more signals to start the operation of the two or more of the plurality of motors are received by the controller concurrently, the controller processes the two or more signals according to an order based on a priority associated with each of the plurality of motors to control the operation.

2. The system according to claim 1, further comprising one or more initiators, each initiator configured to send the controller the signal to start operation of one or more of the plurality of motors.

3. The system according to claim 2, wherein the multiplexed controller communicates directly with each initiator.

4. The system according to claim 1, wherein the multiplexed controller generates a waveform to control the operation of each of the plurality of motors.

5. The system according to claim 1, wherein the multiplexed controller performs closed loop control on a motor of the plurality of motors.

6. The system according to claim 1, wherein the plurality of motors is located within a mobile platform.

7. The system according to claim 6, wherein the plurality of motors is located within an aircraft.

8. The system according to claim 1, further comprising a plurality of the multiplexed controllers, a number of the plurality of the multiplexed controllers being less than a number of the plurality of motors, the plurality of the multiplexed controllers performing parallel processing to control the operation of two or more of the plurality of motors simultaneously.

9. The system according to claim 1, wherein the multiplexed controller stores a configuration file comprising a type of each of the plurality of motors and the priority associated with each of the plurality of motors.

10. A method of controlling a plurality of motors, the method comprising:
    receiving, at a processor of a multiplexed controller, one or more signals to initiate operation of respective one or more motors directly from corresponding one or more initiators;
    prioritizing, based on priority information stored in a memory device, the signals when two or more signals are received; and
    processing the signals, with the processor, based on a result of the prioritizing to generate waveforms to drive the respective motors.

11. The method according to claim 10, wherein the prioritizing is based on the priority information stored in a configuration file in the memory device, the configuration file also storing a type of the plurality of motors.

12. The method according to claim 10, further comprising performing closed loop control on at least one of the respective motors, with the processor, based on the result of the prioritizing.

13. A multiplexed controller comprising:
    an input interface to receive one or more signals directly from corresponding one or more initiators;
    a processor configured to process the one or more signals to output waveforms to respective one or more motors whose operation is controlled by the waveforms; and
    a memory device storing priority information including a relative priority of the one or more signals, wherein the processor processes the one or more signals according to the priority information.

14. The controller according to claim 13, wherein the memory device stores a configuration file to store a type of each of the plurality of motors and the priority information.

15. The controller according to claim 13, further comprising a power switching device and a filter to generate the waveforms.

\* \* \* \* \*